US011189013B2

(12) United States Patent
Navarrete Michelini et al.

(10) Patent No.: US 11,189,013 B2
(45) Date of Patent: Nov. 30, 2021

(54) IMAGE PROCESSING APPARATUS, IMAGE PROCESSING METHOD THEREOF, IMAGE PROCESSING SYSTEM, AND TRAINING METHOD THEREOF

(71) Applicant: BOE TECHNOLOGY GROUP CO., LTD., Beijing (CN)

(72) Inventors: Pablo Navarrete Michelini, Beijing (CN); Dan Zhu, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 193 days.

(21) Appl. No.: 16/465,294

(22) PCT Filed: Dec. 17, 2018

(86) PCT No.: PCT/CN2018/121466
§ 371 (c)(1),
(2) Date: May 30, 2019

(87) PCT Pub. No.: WO2019/184462
PCT Pub. Date: Oct. 3, 2019

(65) Prior Publication Data
US 2021/0097645 A1    Apr. 1, 2021

(30) Foreign Application Priority Data
Mar. 30, 2018 (CN) .......................... 201810280478.2

(51) Int. Cl.
*G06T 3/40* (2006.01)
*G06T 5/50* (2006.01)

(52) U.S. Cl.
CPC .......... *G06T 3/4046* (2013.01); *G06T 3/4053* (2013.01); *G06T 5/50* (2013.01);
(Continued)

(58) Field of Classification Search
None
See application file for complete search history.

(56) References Cited

U.S. PATENT DOCUMENTS

2012/0328210 A1* 12/2012 Fattal ...................... G06T 3/403
382/264
2013/0301933 A1* 11/2013 Salvador ............... G06T 3/4053
382/205
(Continued)

FOREIGN PATENT DOCUMENTS

CN        101872472 A    10/2010
CN        102915527 A     2/2013
(Continued)

OTHER PUBLICATIONS

International Search Report dated Mar. 15, 2019, issued in counterpart application No. PCT/CN2018/121466. (5 pages).
(Continued)

*Primary Examiner* — Jiangeng Sun
(74) *Attorney, Agent, or Firm* — Westerman, Hattori, Daniels & Adrian, LLP

(57) ABSTRACT

The present disclosure relates to an image processing method. The image processing method may include upscaling a feature image of an input image by an upscaling convolutional network to obtain a upscaled feature image; downscaling the upscaled feature image by a downscaling convolutional network to obtain a downscaled feature image; determining a residual image between the downscaled feature image and the feature image of the input image; upscaling the residual image between the downscaled feature image and the feature image of the input image to obtain an upscaled residual image; correcting the upscaled feature image using the upscaled residual image to obtain a corrected upscaled feature image; and generating a first super-resolution image based on the input image using the corrected upscaled feature image.

22 Claims, 18 Drawing Sheets

(52) U.S. Cl.
CPC .............. *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 2015/0235345 A1* | 8/2015 | Liu ....................... | G06T 3/4007 382/167 |
| 2015/0296232 A1* | 10/2015 | Hwang .......... | H04N 21/234327 348/473 |
| 2017/0178293 A1* | 6/2017 | Marcos ................... | G06K 9/52 |

FOREIGN PATENT DOCUMENTS

| | | |
|---|---|---|
| CN | 103426148 A | 12/2013 |
| CN | 104853059 A | 8/2015 |
| CN | 105976318 A | 9/2016 |
| CN | 107369189 A | 11/2017 |
| CN | 107527044 A | 12/2017 |

OTHER PUBLICATIONS

Office Action dated Jul. 2, 2020, issued in counterpart CN Application No. 201810280478.2, with English Translation. (18 pages).

\* cited by examiner

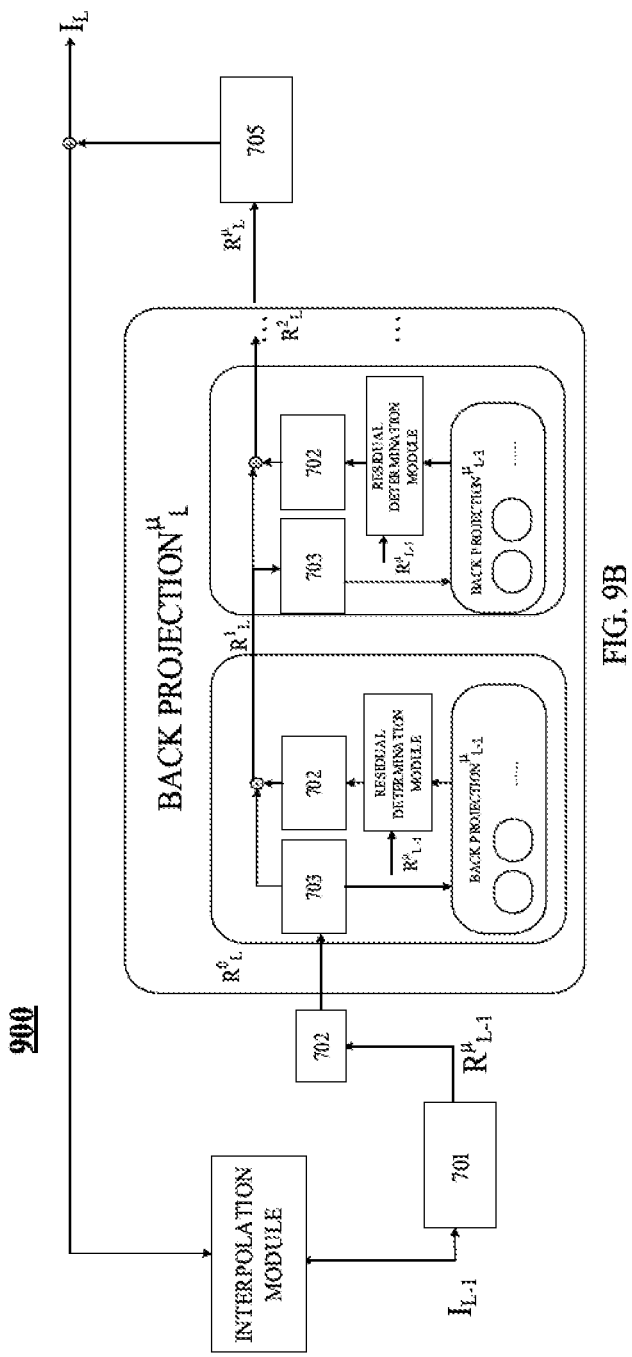

No BP (μ=0)

V-Cycle (μ=1)

IMAGE PROCESSING APPARATUS, IMAGE PROCESSING METHOD THEREOF, IMAGE PROCESSING SYSTEM, AND TRAINING METHOD THEREOF

CROSS-REFERENCE TO RELATED APPLICATIONS

This application claims benefit of the filing date of Chinese Patent Application No. 201810280478.2 filed on Mar. 30, 2018, the disclosure of which is hereby incorporated in its entirety by reference.

TECHNICAL FIELD

The present disclosure relates to the field of image processing, and particularly to an image processing method and apparatus for generating a super-resolution image, an image processing system, and a training method thereof.

BACKGROUND

At present, a super-resolution image is generated by interpolation. For example, standard interpolation algorithms include nearest neighbor, linear, bicubic, and lanczos, etc. Using a standard interpolation algorithm, multiple pixels can be generated based on one pixel in an input image to create a super-resolution image based on the input image. However, detailed features of the image may be missing from the super-resolution image generated by a standard interpolation algorithm.

BRIEF SUMMARY

An embodiment of the present disclosure provides an image processing method. The image processing method may include upscaling a feature image of an input image by an upscaling convolutional network to obtain a upscaled feature image; downscaling the upscaled feature image by a downscaling convolutional network to obtain a downscaled feature image; determining a residual image between the downscaled feature image and the feature image of the input image; upscaling the residual image between the downscaled feature image and the feature image of the input image to obtain an upscaled residual image; correcting the upscaled feature image using the upscaled residual image to obtain a corrected upscaled feature image; and generating a first super-resolution image based on the input image using the corrected upscaled feature image. A resolution of the upscaled feature image may be larger than a resolution of the feature image of the input image, and a resolution of the downscaled feature image may be equal to the resolution of the feature image of the input image.

Optionally, determining the residual image between the downscaled feature image and the feature image of the input image comprises splicing the downscaled feature image and the feature image of the input image to obtain a spliced image and transforming the spliced image by a transformation convolutional network to form the residual image between the downscaled feature image and the feature image of the input image. A size of the spliced image is a sum of sizes of the downscaled feature image and the feature image of the input image, and a size of the residual image is equal to a size of the feature image of the input image.

Optionally, determining the residual image between the downscaled feature image and the feature image of the input image comprises de-superimposing the feature image of the input image and the downscaled feature image to obtain the residual image.

Optionally, correcting the upscaled feature image using the upscaled residual image to obtain a corrected upscaled feature image comprises superimposing the upscaled feature image and the upscaled residual image.

Optionally, determining the residual image between the downscaled feature image and the feature image of the input image comprises determining a first residual image between the downscaled feature image and the feature image of the input image; upscaling the first residual image between the downscaled feature image and the feature image of the input image to obtain an upscaled first residual image; correcting the upscaled feature image by using the upscaled first residual image to obtain a corrected first upscaled feature image; downscaling the corrected first upscaled feature image to obtain a second downscaled feature image; and determining a second residual image between the second downscaled feature image and the feature image of the input image.

Optionally, the steps of determining the first residual image to determining the second residual image are repeated until a μth residual image between a μth downscaled feature image and the feature image of the input image is determined, where μ is an integer larger than 2.

Optionally, upscaling the residual image between the downscaled feature image and the feature image of the input image to obtain the upscaled residual image comprises comparing the first residual image and the second residual image and upscaling the second residual image to obtain the upscaled residual image when a difference between the second downscaled feature image and the feature image of the input image is smaller than a difference between the first downscaled feature image and the feature image of the input image.

Optionally, comparing the first residual image and the second residual image comprises determining an average of absolute values of all elements or an arithmetic square root of a sum of squares of all elements in a pixel matrix of the first residual image as a first residual value; determining correspondingly an average of absolute values of all element or an arithmetic square root of a sum of squares of all elements in a pixel matrix of the second residual image as a second residual value; and determining a difference of the first residual value and the second residual value.

Optionally, correcting the upscaled feature image using the upscaled residual image to obtain a corrected upscaled feature image comprises superimposing the upscaled feature image and the upscaled residual image to obtain the corrected upscaled feature image.

Optionally, upscaling the feature image of the input image by the upscaling convolutional network to obtain the upscaled image comprises upscaling the feature image of the input image n times using a plurality of upscaling convolutional networks to determine a plurality of upscaled images based on the input image. The plurality of upscaled images includes at least a first upscaled image and a nth upscaled image, a resolution of the nth upscaled image is larger than a resolution of the first upscaled image, and n is a positive integer greater than 1.

Optionally, downscaling the upscaled feature image by the downscaling convolutional network to obtain the downscaled feature image comprises downscaling the upscaled feature image n times using a plurality of downscaling convolutional networks to determine a plurality of downscaled feature images based on the first upscaled image. The plurality of downscaled images include at least a first downscaled feature image and a nth downscaled feature image, a resolution of the nth downscaled feature image is smaller than a resolution of the first downscaled image, and the resolution of the nth downscaled image is equal to the resolution of the feature image of the input image, and n is a positive integer greater than 1.

Optionally, the upscaled feature image is corrected µ times using upscaled residual images to obtain the corrected upscaled feature image, wherein µ is a positive integer greater than 2.

Optionally, n=2 and µ=1; or n=3 and µ=1; or n=2 and µ=2; or n=3 and µ=2.

Optionally, the image processing method further comprises interpolating the input image to obtain a second super-resolution image based on the input image and superimposing the first super-resolution image and the second super-resolution image. A resolution of the second super-resolution image is equal to a resolution of the first super-resolution image.

One example of the present disclosure is an image processing system. The image processing system may include a first upscaling module, configured to upscale a feature image of an input image to obtain a upscaled feature image; a first downscaling module, configured to downscale the upscaled feature image to obtain a downscaled feature image; a first residual determination module, configured to determine a residual image between the downscaled feature image and the feature image of the input image; and a second upscaling module, configured to upscale the residual image between the downscaled feature image and the feature image of the input image to obtain a upscaled residual image. A resolution of the upscaled feature image is larger than a resolution of the feature image of the input image, and a resolution of the downscaled feature image is equal to a resolution of the feature image of the input image.

Optionally, the image processing system further comprises a correction module and a synthesis module after the second upscaling module. The correction module is configured to correct the upscaled feature image using the upscaled residual image to obtain a corrected first upscaled feature image; and the synthesis module is configured to generate a first super-resolution image based on the input image using the corrected first upscaled feature image.

Optionally, the image processing system further comprises an interpolating module before the analysis module. The interpolating module is configured to interpolate the input image to obtain a second super-resolution image based on the input image, wherein a resolution of the second super-resolution image is equal to a resolution of the first super-resolution image.

Optionally, the image processing system further comprises a pre-processing module before the first upscaling module. The pre-processing module has a same structure as the first residual determination module, and the pre-processing module is configured to pre-treat the input image before the first upscaling module.

Optionally, the image processing system, after the correction module, further comprises a second downscaling module; a second residual determination module; and a third upscaling module. The second downscaling module is configured to downscale the corrected first upscaled feature image to obtain a second downscaled feature image; the second residual determination module is configured to determine a second residual image between the second downscaled feature image and the feature image of the input image; and the third upscaling module is configured to upscale the second residual image to obtain a corrected second residual image.

Optionally, the first upscaling module comprises a plurality of sub-upscaling modules. The plurality of sub-upscaling modules is configured to upscale the feature image of the input image n times using a plurality of upscaling convolutional networks to determine a plurality of upscaled images based on the input image. The plurality of upscaled images includes at least a first upscaled image and a nth upscaled image, a resolution of the nth upscaled image is larger than a resolution of the first upscaled image, and n is a positive integer greater than 1.

Optionally, the first downscaling module comprises a plurality of sub-downscaling modules. The plurality of sub-downscaling modules is configured to downscale the upscaled feature image a times using a plurality of downscaling convolutional networks to determine a plurality of downscaled feature images based on the upscaled image. The plurality of downscaled images include at least a first downscaled feature image and a nth downscaled feature image, a resolution of the nth downscaled feature image is smaller than a resolution of the first downscaled image, and the resolution of the nth downscaled image is equal to a resolution of the input image.

Another example of the present disclosure is an image processing apparatus. The image processing apparatus comprises a memory and a processor, wherein the memory stores a program code readable by the processor, and when the processor executes the program code, the image processing apparatus is caused to perform the following steps: upscaling a feature image of an input image by an upscaling convolutional network to obtain a upscaled feature image; downscaling the upscaled feature image by a downscaling convolutional network to obtain a downscaled feature image; determining a residual image between the downscaled feature image and the feature image of the input image; upscaling the residual image between the downscaled feature image and the feature image of the input image to obtain an upscaled residual image; correcting the upscaled feature image using the upscaled residual image to obtain a corrected upscaled feature image; and generating a first super-resolution image based on the input image using the corrected upscaled feature image. A resolution of the upscaled feature image is larger than a resolution of the feature image of the input image, and a resolution of the downscaled feature image is equal to the resolution of the feature image of the input image.

Another example of the present disclosure is a training method. The method may include performing image processing on an input image using the image processing system according to claim 16 in a finite number of iterations, wherein an objective function is optimized during the finite number of iterations, the objective function is a loss function between the first super-resolution image and the input image, and the objective function comprises: a loss residual:

$$L_{res} = \sum_{l=0}^{L} w_l \sigma(R_l^\mu)$$

wherein L is a number of times of upscaling in the image processing system, w is a predetermined weigh factor, and a is a loss metric.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

FIG. 9B is a schematic diagram of an image processing system according to one embodiment of the present disclosure;

DETAILED DESCRIPTION

Figure 1:
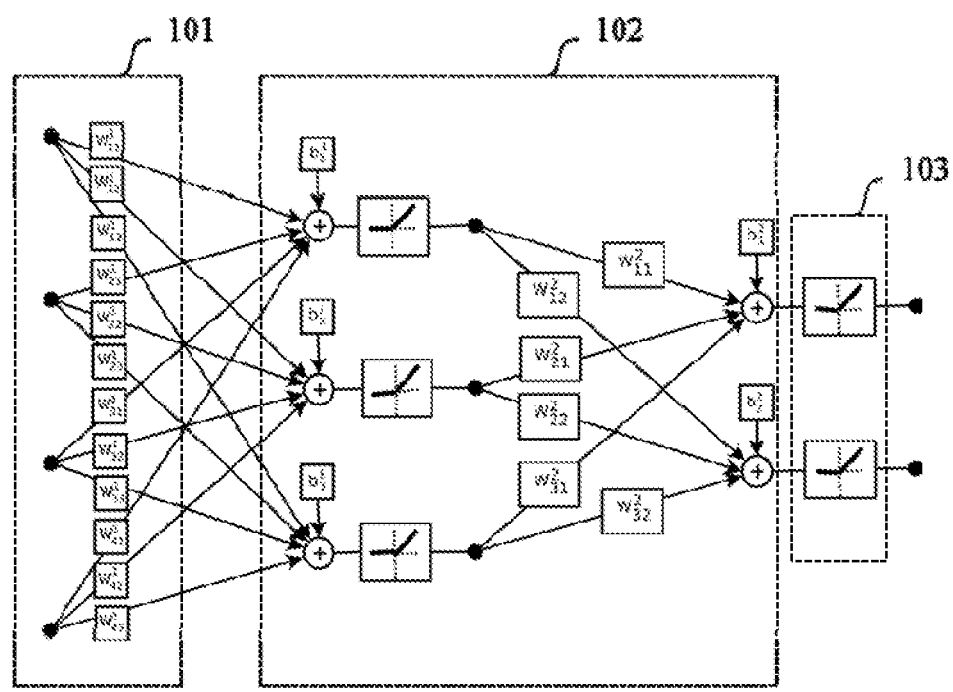
FIG. 1 is a schematic diagram of a convolutional network for image processing in the related art.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-11. When referring to the figures, like structures and elements shown throughout are indicated with like reference numerals.

Unless otherwise defined, any technical or scientific term used herein shall have the common meaning understood by a person of ordinary skills. Such words as "first" and "second" used in the specification and claims are merely used to differentiate different components rather than to represent any order, number or importance of the components. Similarly, such word as "including" or "comprising" are merely used to represent that the element or unit presented prior to the word contains elements, units and the like enumerated subsequent to the word, instead of excluding other elements or units. Such words as "connect" or "connected to" may include direct or indirect, electrical or mechanical connection.

The Information Technology market has seen strong investments in the field of Deep Learning in the last 5 years. The main use of this technology today is for the solution of artificial intelligence (AI) problems such as: recommendation engines, image classification, image captioning and searching, face recognition, age recognition, speech recognition, etc. Generally speaking, deep learning technologies have been successful in the solution of human-like understanding of data, such as describing content of an image, or identifying objects in images in difficult conditions, or recognizing speech in noisy environments. Another advantage of deep learning is its generic structure that allows relatively similar systems to solve very different problems. Compared to its predecessor methods, neural networks, deep learning structures are much larger in number of filters and layers.

Some embodiments of the present invention herein introduce a deep neural network structure to solve the problem of super-resolution. This is very different compared to applications solving classification problems. For classification problems, the input is high dimensional data (e.g. images or video) and the output is low-dimensional data (e.g. labels, location of objects, etc.). Current advances in deep learning are highly tuned for this particular case. For example, one of the most common layers in deep learning structures is the so-called max-pooling layer, that reduces the dimensions of feature images by taking the maximum value among neighboring pixels. On the other hand, the super-resolution problem takes high dimensional data as inputs (images), and increases its dimension to an even larger amount of data. This changes completely the design of the deep learning structure.

FIG. 1 is a schematic diagram of a convolutional network for image processing. A convolutional network for image processing is a neural network structure that uses images as input and output, and replaces scalar weights by filters (i.e., convolutions). A convolutional network having a simple structure of three layers is shown in FIG. 1. As shown in FIG. 1, four input images are input in the input layer 101. Three units are present in the middle hidden layer 102 to output three output images. Two units are present in the output layer 103 to output two output images. Each box in the input layer 101 having a weight $w_{ij}^k$ corresponds to a filter, where k is a label indicating the input layer number, and i and j are labels indicating the input and output units, respectively. The biases bi are the scalars added to the output of the convolution. The results of the addition of several convolutions and biases then pass through the activation box, which typically corresponds to a linear rectification function (ReLU), a sigmoid function, or a hyperbolic tangent function. In an image processing system utilizing a convolutional network, each filter and bias are fixed during operation of the system. Each filter and bias are obtained in advance by using a set of input/output sample images and adjusting to meet some application-dependent optimization criteria. A typical configuration involves one tenth or hundreds of filters in each layer. A network with 3 layers is considered shallow while a network with a number of layers greater than 5 or 10 is generally considered deep.

Using the convolutional network shown in FIG. 1, after a certain amount of training, the convolutional network can be used to generate super-resolution images based on input images. For example, an original high-resolution image and a low-resolution image generated by downscaling the high-resolution image using a standard algorithm can be used to train the convolutional network.

Figure 2:
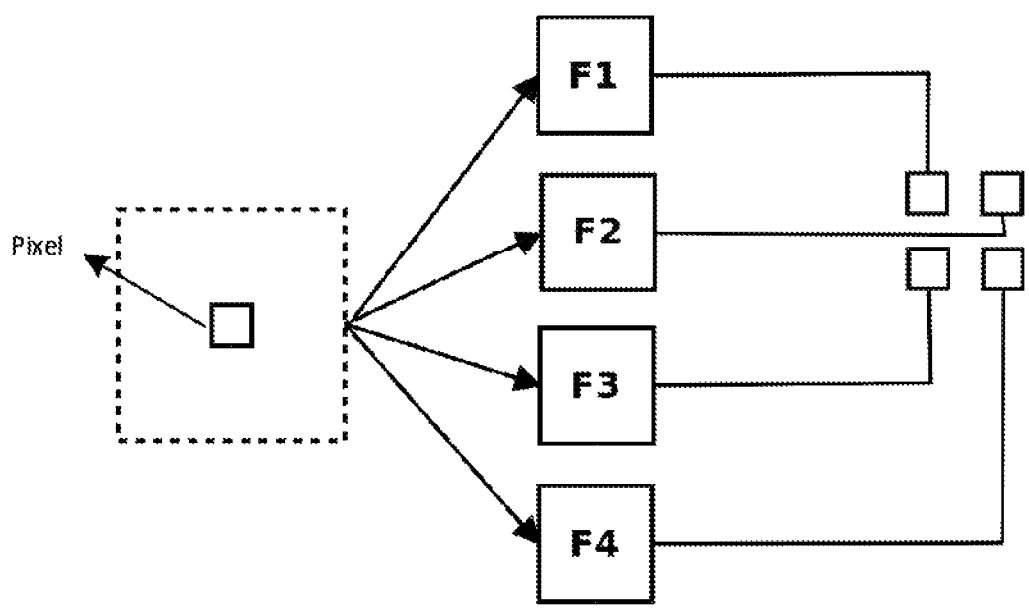
FIG. 2 is a schematic diagram of a upscaler according to one embodiment of the present disclosure.

FIG. 2 illustrates an upscaler according to one embodiment of the present disclosure. The upscalers can include, for example, bicubic interpolation, linear interpolation, lanczos difference, etc. FIG. 2 is a schematic diagram of a 2×2 upscaler. Each small square represents one pixel in the image. An output of four pixels can be determined based on an input of 1 pixel. After the above upscaling process is performed on each pixel in the input image, a super-resolution output image can be obtained by utilizing the four output pixels from each input pixel. A length and a width of the super-resolution image are twice a length and a width of the input image, respectively.

Figure 3:
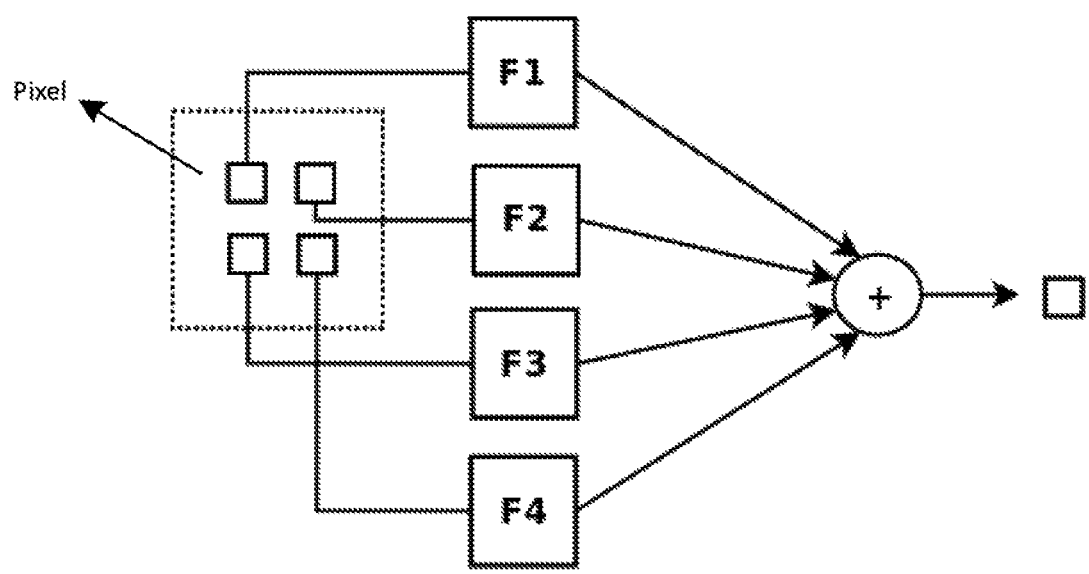
FIG. 3 is a schematic diagram of a downscaler according to one embodiment of the present disclosure.

FIG. 3 is a schematic diagram of a downscaler where each small square represents one pixel in an image. As shown in FIG. 3, the downscaler is configured to determine one output pixel based on four input pixels. For example, the downscaler includes four filters F1, F2, F3, and F4, and the four filters are applied to four input pixels respectively, where filters F1, F2, F3, and F4 can be different filters. A superimposition process is performed on the four pixels outputted from filters F1, F2, F3, and F4 to generate a target output pixel. As such, a low resolution output image can be obtained by the downscaling process as above. A length and a width of the output image can be half of a length and a width of the input image, respectively.

Figure 4A:
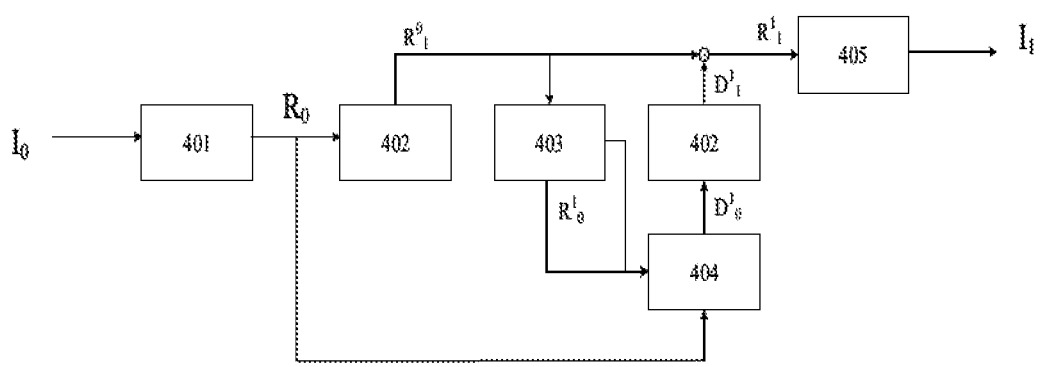
FIG. 4A is a schematic diagram of an image processing system according to one embodiment of the present disclosure.

FIG. 4A is a schematic diagram of an image processing system 400 according to one embodiment of the present disclosure. As shown in FIG. 4A, the image processing system 400 includes an analysis module 401, an upscaling module 402, a downscaling module 403, a residual determination module 404, and a synthesis module 405. As shown in FIG. 4A, $I_0$ represents an original image received by the image processing system 400, and $I_1$ represents a super-resolution image obtained after the original image has been processed by the image processing system 400. The analysis module 401, the upscaling module 402, the downscaling module 403, and the synthesis module 405 of the image processing system can be implemented by the convolutional network as shown in FIG. 1. Exemplary models of convolutional networks include the convolutional neural networks (CNN), residual networks (ResNet), densely connected convolutional networks (Densenet), convolutional neural networks with alternately updated clique (CliqueNet), and filter banks, etc.

In some embodiments, the upscaling module 402 includes a combination of a convolutional network as shown in FIG. 1 and an upscale layer. That is, the upscaling module 402 may include the convolutional network described above, which is used to transform a feature image, and then the upscale layer is configured to upscale the transformed feature image. The upscale layer can include a muxout layer, a strided transposed convolution, or a standard per-channel upscaler (e.g., bicubic interpolation).

In some embodiments, similarly, the downscaling module 403 includes a combination of the convolutional network as shown in FIG. 1 and a downscale layer. That is, the downscaling module 403 can downscale the transformed image by using the downscale layer, and then perform image transformation on the feature image by using the convolutional network. The downscale layer can include a transposed-muxout layer, a strided convolution, a maxpooling layer, or a standard per-channel downscaler (e.g., bicubic interpolation).

In some embodiments, the analysis module 401 is configured to determine a feature image $R_0$ of an input image $I_0$. A resolution of the feature image $R_0$ is equal to a resolution of the input image $I_0$. The number of channels of the feature image $R_0$ is larger than the number of channels of the input image $I_0$. For example, the input image $I_0$ is a color image that has a resolution of 128×128, and the input image $I_0$ includes three channels: red (R), green (G), and blue (B). The resolution of the feature image $R_0$ obtained after being processed by the analysis module 401 is equal to the resolution of the input image $I_0$, that is, 128×128, and the number of channels of the feature image $R_0$ is greater than three. For example, the number of channels of the feature image $R_0$ can be 64, 128, or other predetermined numbers. By first decomposing the input image into a feature image having a larger number of channels and representing multiple dimensions of features of the input image, the upscaling and downscaling of the image can be better achieved using a convolutional network in the following steps.

In some embodiments, the upscaling module 402 is configured to perform a upscaling process on the feature image $R_0$ to obtain a first upscaled feature image $R_1^0$. Here, the resolution of the first upscaled feature image $R_1^0$ is larger than the resolution of the feature image $R_0$ of the input image. The number of channels of the first upscaled feature image $R_1^0$ is equal to the number of channels of the feature image $R_0$ of the input image. In one embodiment, the upscaling module 402 is configured to perform a 2×2 upscaling. When the feature image $R_0$ is an image of 128×128×64, the first upscaled feature image $R_1^0$ outputted after processing by the upscaling module 402 is an image of 256×256×64.

In some embodiments, the downscaling module 403 is configured to downscale the first upscaled feature image $R_1^0$ to obtain a first downscaled feature image $R_0^1$. Here, the resolution of the first downscaled feature image $R_0^1$ is equal to the resolution of the feature image $R_0$, and the number of channels of the first downscaled feature image $R_1^0$ is equal to the number of channels of the feature image $R_0$.

In some embodiments, the residual determination module 404 is configured to, based on the first downscaled feature image $R_0^1$ and the feature image $R_0$, determine a residual image between the first downscaled feature image $R_0^1$ and the feature image $R_0$. The residual image represents a magnitude of difference between the first downscaled feature image $R_0^1$ and the feature image $R_0$. In some embodiments, the residual determination module 404 is configured to generate a residual image $D_0^1$ by linearly combining the first downscaled feature image $R_0^1$ and the feature image $R_0$. In one embodiment, $D_0^1=\alpha R_0^1+\beta R_0$. When $\alpha=1$, $\beta=-1$, the residual image represents the difference between the first downscaled feature image $R_0^1$ and the feature image $R_0$. One of ordinary skill in the art would appreciate that the values of $\alpha$ and $\beta$ can be set individually based on actual circumstances. In one embodiment, $\alpha=1.1$, $\beta=-0.9$. The above values of $\alpha$ and $\beta$ are only illustrated as an exemplary example, and are not intended to limit the scope of the present disclosure. In some embodiments, a residual image based on the first downscaled feature image $R_0^1$ and the feature image $R_0$ can be generated by a convolutional network.

Figure 4B:
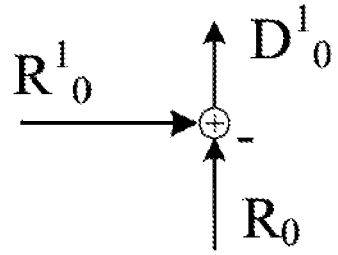
FIG. 4B is a schematic diagram of a residual determination module according to one embodiment of the present disclosure.

FIG. 4B is a schematic diagram of an exemplary residual determination module according to one embodiment of the present disclosure. As shown in FIG. 4B, the residual determination module 404 is configured to include a de-superimposition module. The de-superimposition module is configured to linearly combine the first downscaled feature image $R_0^1$ and the feature image $R_0$ of the input image. FIG. 4B illustrates when $\alpha=1$, $\beta=-1$ as described above. The de-superimposition module is configured to de-superimpose the first downscaled feature image $R_0^1$ and the feature image $R_0$, that is, subtracting a corresponding pixel matrix of the feature image $R_0$ of the input image from a pixel matrix of the first downscaled feature image $R_0^1$ to obtain a residual $D_0^1$ between the first downscaled feature image $R_0^1$ and the feature image $R_0$ of the input image.

Figure 4C:
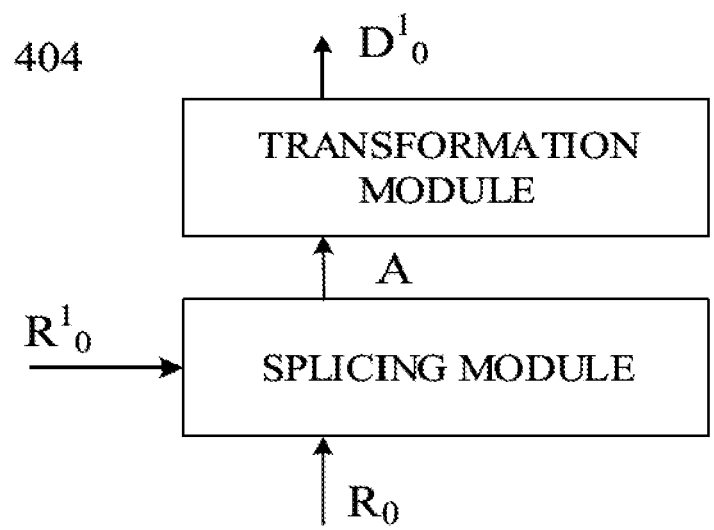
FIG. 4C is a schematic diagram of a residual determination module according to one embodiment of the present disclosure.

FIG. 4C is a schematic diagram of an exemplary residual determination module according to one embodiment of the present disclosure. The residual determination module as shown in FIG. 4C is configured to transform the first downscaled feature image $R_0^1$ and the feature image $R_0$ by a convolutional network, and to set an output of the convolutional network as the residual between the first downscaled feature image $R_0^1$ and the feature image $R_0$.

In some embodiments, as shown in FIG. 4C, the residual determination module includes a splicing module. The splicing module may splice the first downscaled feature image $R_0^1$ and the feature image $R_0$. For example, the first downscaled feature image $R_0^1$ and the feature image $R_0$ can be spliced together in a predetermined manner. As described above, the resolution of the first downscaled feature image $R_0^1$ is equal to the resolution of the feature image $R_0$ of the input image. As an example, when the size of the first downscaled feature image $R_0^1$ and the feature image $R_0$ of the input image is 32×5×5, then the size of the spliced image A obtained by the splicing module is 64×5×5. In one embodiment, the spliced image A may be obtained by arranging the feature image $R_0$ being above the first downscaled feature image $R_0^1$. In one embodiment, the spliced image A may be obtained by arranging the feature image $R_0$ being below the first downscaled feature image $R_0^1$. Here, as long as the two images are always spliced in a predetermined manner during the image processing, the splicing process is not limited to above examples.

Figure 4D:
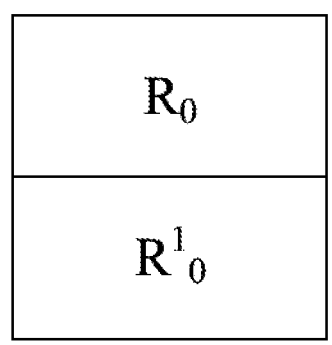
FIG. 4D is a schematic diagram of a spliced image according to one embodiment of the present disclosure.

FIG. 4D is an exemplary schematic diagram of a spliced image A. By splicing the first downscaled feature image $R_0^1$ and the feature image $R_0$, a spliced image having twice the size of the feature image $R_0$ can be obtained.

In some embodiments, the residual determination module 404 also includes a transformation module. The transformation module may be a convolutional network as shown in FIG. 1. The transformation module is configured to receive a spliced image outputted from the splicing module as an input, and transform the spliced image to a feature image having the same size as the feature image $R_0$ of the input image. The transformed feature image obtained by the transformation module can be used as a residual between the first downscaled feature image $R_0^1$ and the feature image $R_0$ of the input image.

As described above, the first downscaled feature image $R_0^1$ is obtained by first upscaling and then downscaling the feature image $R_0$ of the input image. The resolution of the first downscaled feature image $R_0^1$ is equal to the resolution of the feature image $R_0$. For a system with precision, a first downscaled feature image $R_0^1$ obtained by first upscaling and then downscaling the feature image should be the same as the feature image $R_0$ of the original input image that has not been upscaled or downscaled. However, in an actual image processing system, since the resolution of the image needs to be increased by an estimation method when performing an upscaling operation on the image, there is a difference between the first downscaled feature image $R^1_0$ obtained by downscaling the first upscaled feature image $R^0_1$ obtained by the estimation method and the feature image $R_0$ of the original input image. The difference between the first downscaled feature image $R_0^1$ and the feature image $R_0$ of the original input image may be used to correct the first upscaled feature image $R_1^0$. For example, the residual $D_0^1$ between the first downscaled feature image $R_0^1$ and the feature image $R_0$ may be upscaled to obtain an upscaled residual $D_1^1$, where a resolution of the upscaled residual $D_1^1$ is equal to the resolution of the first upscaled feature image $R_0^1$. By superimposing the upscaled residual $D_1^1$ onto the first upscaled feature image $R_1^0$, the first upscaled feature image $R_1^0$ is corrected.

In some embodiments, as shown in FIG. 4A, the upscaling module 402 is configured to upscale the residual $D_0^1$ determined by the residual determination module 404 to obtain the upscaled residual $D_1^1$. The resolution of the upscaled residual $D_1^1$ is equal to the resolution of the first upscaled feature image $R_1^0$. By superimposing the upscaled residual $D_1^1$ onto the first upscaled feature image $R_1^0$, a corrected first upscaled feature image $R_1^1$ can be obtained. In some embodiments, a convolutional network may be used to correct the first upscaled feature image $R_1^0$. For example, the upscaled residual $D_1^1$ and the first upscaled feature image $R_0^1$ are inputted into the convolutional network, and an output of the convolutional network is used as a corrected result.

In some embodiments, the synthesis module 405 is configured to, using the corrected first upscaled feature image $R_1^1$, generate a super-resolution image $I_1$ based on the original input image $I_0$. The resolution of the super-resolution image $I_1$ obtained by the synthesis module 405 is equal to the resolution of the first upscaled feature image $R_1^0$, and the number of channels of the super-resolution image $I_1$ is equal to the number of channels of the original input image $I_0$. For example, when the original input image $I_0$ is a color image, the super-resolution image $I_1$ generated based on the original input image is also a color image. When the original input image $I_0$ is a grayscale image, the super-resolution image $I_1$ generated based on the original input image is also a grayscale image. In the image processing system as shown in FIG. 4A, the magnification ratio of the super-resolution image $I_1$ relative to the input image $I_0$ is the magnification ratio of the upscaling module.

The image processing system 400 as shown in FIG. 4A is configured to obtain a super-resolution image based on an input image by upscaling the input image using a convolutional network. During the process, the upscaled input image can be downscaled, and a difference between the image obtained by upscaling and then downscaling and the original input image can be obtained by comparison of the two images. The difference may be used to correct the upscaled input image, and to output a corrected upscaled image as a super-resolution image of the input image.

Figure 5:
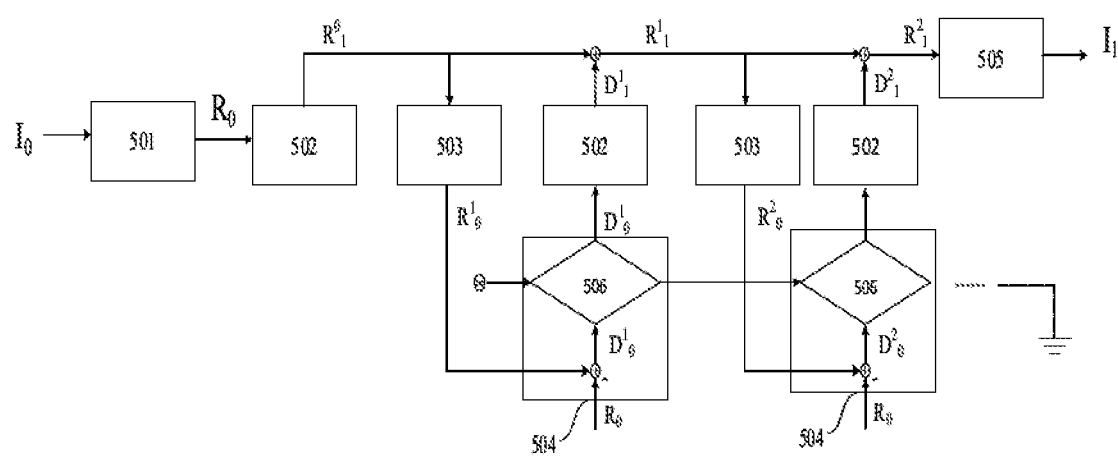
FIG. 5 is a schematic diagram of an image processing system according to one embodiment of the present disclosure.

FIG. 5 is a schematic diagram of an image processing system 500 according to one embodiment of the present disclosure. The analysis module 501, the upscaling module 502, the downscaling module 503, and the synthesis module 505 as shown in FIG. 5 have a similar structure as the analysis module 401, the upscaling module 402, the downscaling module 403, and the synthesis module 405 as shown in FIG. 4, and all the modules can be implemented using the convolutional network as shown in FIG. 1. The details thereof are not described below.

In some embodiments, the image processing system 500 as shown in FIG. 5 includes a plurality of residual determination modules 504, and a plurality of downscaling modules. The plurality of residual determination modules and the plurality of downscaling modules are configured to downscale the upscaled input image multiple times and also perform multiple residual corrections on the upscaled image. Taking the image processing system 400 shown in FIG. 4A as an example, after the first upscaled feature image has been corrected by the first residual to obtain a corrected first upscaled feature image (hereafter "a second upscaled feature image") $R_1^1$, the downscaling module is configured to downscale the second upscaled feature image $R_1^1$ to obtain a second downscaled feature image $R_0^2$. After comparing the difference between the second downscaled feature image $R_0^2$ and the feature image $R_0$ of the input image, the second upscaled feature image $R_1^1$ can be corrected.

In some embodiments, the residual determination module 504 shown in FIG. 5 further includes a residual control module 506. The residual control module 506 is configured to control a residual size used in a residual correction process.

In one embodiment, as shown in FIG. 5, the first upscaled feature image and the feature image of the input image are de-superimposed to determine the residual. When the second upscaled feature image $R_1^1$ is obtained, the downscaling module 503 is configured to downscale the second upscaled feature image $R_1^1$ to obtain the second downscaled feature image $R_0^2$. The second residual $D_0^2$ between the second downscaled feature image $R_0^2$ and the feature image $R_0$ of the input image can be determined by de-superimposing the second downscaled feature image $R_0^2$ and the feature image $R_0$ of the input image.

In some embodiments, the residual for correcting the upscaled image in the current step may be determined based on the first residual $D_0^1$ generated in the previous step and the second residual $D_0^2$ generated in the current step. In some embodiments, the residual control module 506 is configured to compare the size of the first residual $D_0^1$ generated in the previous step in the iterative process with the second residual $D_0^2$ generated in the current step. When the second residual $D_0^2$ is smaller than the first residual $D_0^1$, it can be considered that the difference between the upscaled image and the original input image is further reduced by the iterative process. Therefore, the residual control module outputs the second residual $D_0^2$ as a residual for correcting the second upscaled feature image $R_1^1$. In some embodiments, the residual control module 506 is configured to set a larger residual of the first residual $D_0^1$ and the second residual $D_0^2$ as the residual to correct the second upscaled feature image $R_1^1$. In some embodiments, the residual control module 506 is configured to set an average of the first residual $D_0^1$ and the second residual $D_0^2$ as a residual for correcting the second upscaled feature image $R_1^1$.

In some embodiments, as shown in FIG. 5, an upscaling module 502 is used to upscale the second residual $D_0^2$ outputted from the residual control module 506, and generate a second upscaled residual $D_1^2$. In some embodiments, the second upscaled feature image $R_1^1$ may be corrected by superimposing the second upscaled residual D; with the second upscaled feature image $R_1^1$.

In some embodiments, as shown in FIG. 5, in the above multiple residual correction process, a residual control step is needed after the first residual $D_0^1$ is generated. Because there is no residual generated in the previous step, the previous result of the residual control module in the first residual correction can be set to infinity (or any sufficient large residual).

As previously described, multiple iterations of residual correction can be implemented using the image processing system 500 as shown in FIG. 5. In some embodiments, a user can set a maximum number of iterations for the iterative process as the iteration termination condition. The iterative process terminates when the predetermined maximum number of iterations is reached. In some embodiments, when the image processing system 500 is configured to generate a super-resolution image based on an input image, it can be considered that the difference between the upscaled image and the original image cannot be further improved by iteration when the residual generated during this iteration is greater than the residual generated in the previous iteration. Therefore, the termination condition of the iterative process can be set as that when the residual generated during the current iteration is greater than the residual generated in the previous iteration, the iterative process terminates.

As shown in FIG. 5, the image processing system is configured to perform multiple residual corrections of the upscaled feature image of the input image to achieve a better super-resolution image.

Figure 6A:
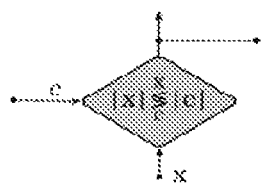
FIG. 6A is a schematic diagram of a residual control module according to one embodiment of the present disclosure.
Figure 6B:
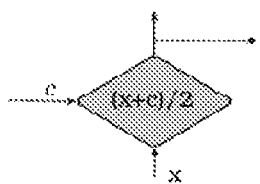
FIG. 6B is a schematic diagram of a residual control module according to one embodiment of the present disclosure.
Figure 6C:
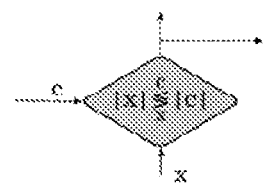
FIG. 6C is a schematic diagram of a residual control module according to one embodiment of the present disclosure.

FIGS. 6A-6C illustrate exemplary embodiments of a residual control module 506 according to some embodiments of the present disclosure.

The residual control module 506 is configured to receive a residual c generated in the previous iteration and a residual x generated in the current iteration as input, and to determine a residual for correcting the upscaled image in the current iteration based on the residual x and the residual c.

FIG. 6A illustrates a residual control module 506 according to one embodiment of the present disclosure. In this embodiment, the residual control module 506 is configured to set and output a smaller residual of the residual x and the residual c as the residual for correcting the upscaled image in the current iteration.

FIG. 6B illustrates a residual control module 306 according to one embodiment of the present disclosure. In this embodiment, the residual control module 506 is configured to set and output an average of the residual x and the residual c as the residual for correcting the upscaled image in the current iteration.

FIG. 6C illustrates a residual control module 506 according to one embodiment of the present disclosure. In this embodiment, the residual control module 506 is configured to compare and output a larger residual of the residual x and residual c as the residual for correcting the upscaled image in the current iteration.

As shown in FIGS. 6A and 6C, the residual x and the residual c can be compared by determining the values of the residual x and the residual c and the difference between the values of the residual x and the residual c. The above mentioned residual represents a magnitude of the difference between the two images from which the residual is generated.

In some embodiments, one of ordinary skill in the art can appreciate, the residual c obtained by de-superimposing the first downscaled feature image $R_0^1$ and the feature image $R_0$ of the input image represents a first residual matrix. The residual x obtained by de-superimposing the second downscaled feature image $R_0^2$ and the feature image $R_0$ of the input image represents a second residual matrix. The value of each element in the first residual matrix and the second residual matrix may represent a difference between pixels of two feature images. In some embodiments, the average of the absolute values of all elements in the residual matrix can be determined as the residual value of the residual matrix. In one embodiment, the sum of the square of all elements in the residual matrix or the arithmetic square root of the sum of square of all elements in the residual matrix can be determined as the residual value of the residual matrix.

In some embodiments, when a super-resolution image based on an input image is generated by an image processing system as shown in FIG. 5, the image processing system is configured to include a residual control module as shown in FIG. 6A. Such residual control module is configured to prevent a residual error from increasing during the iterative process. As a result, a better super-resolution image can be achieved.

In some embodiments, when training a convolutional network in the image processing system as shown in FIG. 5, the residual control module as shown in FIG. 6B or 6C can be utilized. By introducing larger residuals throughout the training process, image processing systems can be optimized even in worse situations.

As previously described, the image processing system as shown in FIGS. 4A and 5 are configured to upscale an input image once. For example, when the upscaling module is to perform a 2× upscaling, the image processing system in FIGS. 4A and 5 are configured to generate a super-resolution image relative to the input image, and the super-resolution image has twice the length and the width of the input image, respectively. In one embodiment, if the resolution of the input image is 128×128, then the resolution of the super-resolution image generated by the image processing system is 256×256. One of ordinary skill in the art will appreciate that 2× upscaling is only one example of the embodiment of the present disclosure. One of ordinary skill in the art can set the upscaling module based on actual situation to achieve different upscaling multiples.

In some embodiments, the image processing system as shown in FIG. 4A or 5 is configured to further upscale a super-resolution image when a higher super-resolution image is needed. For example, when a super-resolution image with a 256×256 resolution as described above is inputted as an input image into the image processing system, and a further enlarged super-resolution image with a 512× 512 resolution can be generated by the image processing system.

Figure 7A:
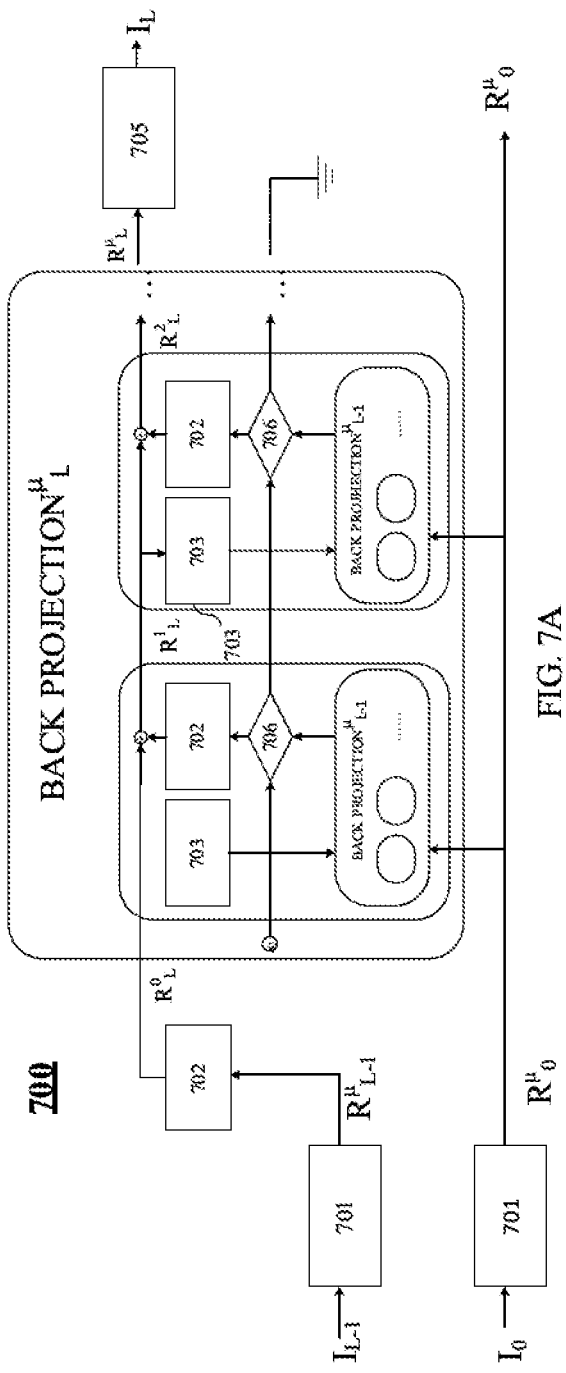
FIG. 7A is a schematic diagram of an image processing system according to one embodiment of the present disclosure.
Figure 7B:
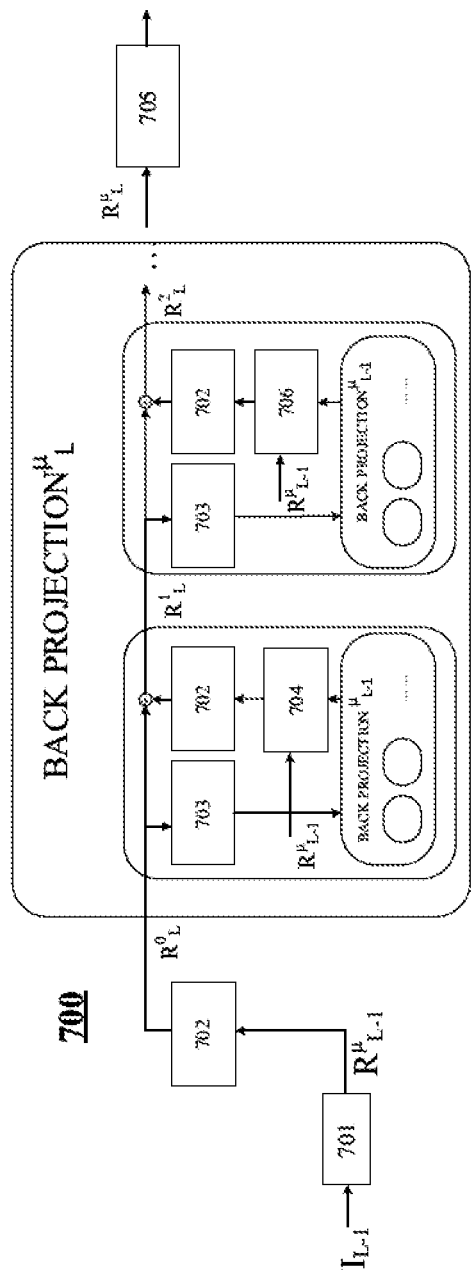
FIG. 7B is a schematic diagram of an image processing system according to one embodiment of the present disclosure.

FIGS. 7A and 7B are schematic diagrams of an image processing system 700 according to one embodiment of the present disclosure. Multiple upscaling of an input image can be achieved using the image processing system 700 illustrated in FIGS. 7A and 7B. FIG. 7A is a schematic diagram of an image processing system wherein the residual determination module includes a residual control module. FIG. 7B is a schematic diagram of an image processing system wherein the residual determination module includes a splicing module and a transformation module.

As described above, it is also possible to obtain a multi-magnified super-resolution image by regenerating the super-resolution image by using the super-resolution image outputted from the image processing system shown in FIG. 4A or FIG. 5 as an input image. However, during the above multiple magnifying process, when determining the residual between the input image and the upscaled image, the super-resolution image obtained by the previous image processing process instead of the original input image is used as the input image for a comparison reference. Therefore, in the above multiple-magnification image processing process, accumulation of errors may occur, thereby affecting the result of the final super-resolution image.

In some embodiments, as shown in FIG. 7A, the image processing system 700 includes an analysis module 701, an upscaling module 702, a downscaling module 703, a residual control module 706, and a synthesis module 705. The above modules are similar to the analysis module, the upscaling module, the downscaling module, the residual control module, and the synthesis module as shown in FIGS. 4A, and 5, and can be implemented by using the convolution network as shown in FIG. 1.

In some embodiments, as shown in FIG. 7A, the process of performing residual correction on the upscaled input image is called back-projection (BP). The output of the residual correction system shown in FIG. 7A is a corrected upscaled feature image. As shown in FIG. 7A, the image processing system 700 may include iterative residual correction systems.

In some embodiments, the input image of the image processing system 700 is a super-resolution image $I_{L-1}$ that has been magnified by L−1 times. For example, the resolution of the input image $I_0$ is 128×128. Then, when L=2, the input image $I_{L-1}$ has been magnified once and its resolution is 256×256.

After the input image $I_{L-1}$ is inputted in the image processing system 700, the analysis module is configured to determine the feature image $R_{L-1}^H$ of the input image. The feature image $R_{L-1}^H$ of the input image is being upscaled by the upscaling module 702 to obtain a first upscaled feature image $R_L^0$ that has a resolution of 512×512. Then, the first upscaled feature image $R_L^0$ may be downscaled multiple times by an iterative residual correction system to generate a downscaled image based on the first upscaled feature image $R_L^0$, and the downscaled image has equal resolution as the original input image $I_0$.

In one embodiment, the first upscaled feature image $R_L^0$ has a resolution of 512×512 can be downscaled to 128×128 by downscaling twice, where it has the same resolution as the original input image $I_0$. A residual for correcting the first upscaled feature image $R_L^0$ of the original input image can be determined by comparing the feature image generated by downscaling multiple times of the first upscaled feature image $R_L^0$ with the feature image $R_0^H$ of the original input image. The residual can be used to correct the first upscaled feature image $R_L^0$.

FIG. 7B shows an image processing system 700 according to one embodiment of the present disclosure. The image processing system 700 includes a residual determination module that is different from the residual determination module in the image processing system 700 as shown in 7A. Operational principles of the residual determination modules have been described in accordance with FIGS. 4A to 4C, and the details thereof are not described herein again.

As shown in FIGS. 7A and 7I, the image processing system is configured to determine a residual between the upscaled image obtained after multiple times of upscaling and the original input image. The residual is used for correcting the upscaled image so that the super-resolution image has a better quality.

An image processing system according to the embodiments of the present disclosure needs to configure parameters L and μ. In some embodiments, the meanings of the parameters L and μ are as follows: in the description of the present disclosure, a feature image obtained by an image processing system may be represented by $R_L^\mu$, where L indicates the number of upscaling times of the feature image. For example, the feature image of the original image $I_0$ can be represented as $R_0$. μ indicates the number of times that the residual correction has been performed on the feature image. For example, as shown in FIG. 5, the upscaled feature image obtained after one residual correction can be represented as $R_1^1$, and the upscaled feature image obtained after two residual corrections can be represented as $R_1^2$.

The structure of the image processing system can be determined by setting the parameters L and μ as described above. For example, for the image processing system 400 as shown in FIG. 4A, L=1 and μ=1. For the image processing system 500 as shown in FIG. 5, L=1, and μ=2. In some embodiments, a user can implement different image processing systems by setting different L and μ.

Figure 8A:
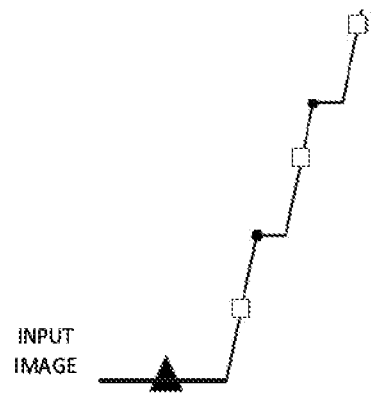
FIG. 8A is a schematic diagram of an image upscaling method according to one embodiment of the present disclosure.
Figure 8B:
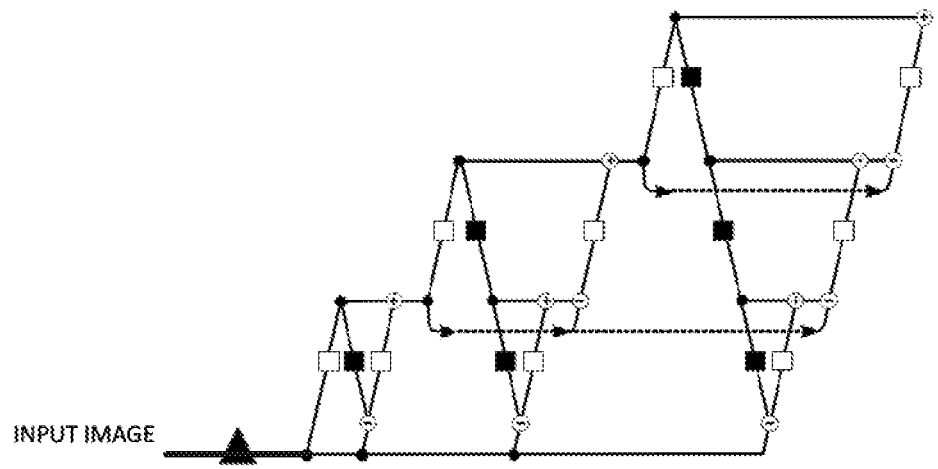
FIG. 8B is a schematic diagram of an image upscaling method according to one embodiment of the present disclosure.
Figure 8C:
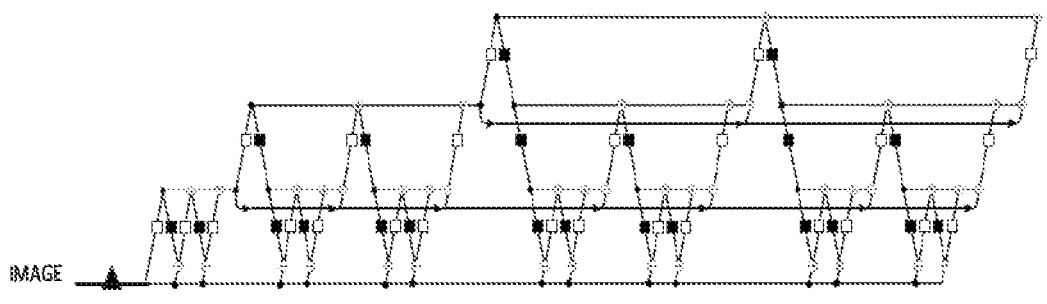
FIG. 8C is a schematic diagram of an image upscaling method according to one embodiment of the present disclosure.

FIGS. 8A to 8C are schematic diagrams of principle of an upscaling process according to some embodiments of the present disclosure. FIG. 8A is a schematic diagram showing correction of an upscaled image without using a residual difference (that is, L=3, μ=0). As shown in FIG. 8A, the analysis module is configured to output a feature image of the input image (the triangle in FIG. 8A represents the analysis module). The upscaling modules (the empty square in FIG. 8A represents the upscaling module) are configured to upscale the feature image of the output image multiple times to generate a super-resolution feature image representing a super-resolution image. In one embodiment, when the upscaling module is configured to double upscaling an image, the image processing process in FIG. 8A is configured to output a 8×8 times upscaled super-resolution feature image.

FIG. 8B is a schematic diagram showing a correction of the upscaled image by using the residual difference between the upscaled image and the original image (that is, L=1, μ=1). The analysis module (represented as a triangle in FIG. 8B) outputs a feature image that represents an output image. The above upscaling module (represented as a white square in FIG. 8B) upscales the feature image of the output image once to generate a first upscaled feature image of a 2×2 times resolution.

In some embodiments, as shown in FIG. 8B, the downscaling module (represented as a black square in FIG. 8B) downscales the first upscaled feature image of 2×2 times resolution, and to determine the residual between the downscaled feature image and the original input image (represented by a circle enclosing a minus sign). By superimposing the residual after the 2×2 upscaling onto the first 2×2 upscaled feature image (represented by a circle enclosing a plus sign), a corrected first upscaled feature image of 2×2 times resolution is generated.

In some embodiments, subsequently, in order to further increase the resolution of the image, the upscaling module is used to further upscale the corrected upscaled feature image of 2×2 times resolution to generate a first upscaled feature image of 4×4 times resolution. In order to correct the first 4×4 upscaled feature image, the downscaling module is used to downscaling twice the first upscaled feature image of 4×4 times resolution, and determine the residual between the downscaled feature image and the original input image, where the residual represents the difference between the first upscaled feature image of 4×4 times resolution and the original input image. In some embodiments, the residual between the downscaled feature image and the original input image can be upscaled twice to generate a residual of a 4×4 times resolution. The first feature image of the 4×4 times resolution can be corrected by the residual difference of a 4×4 times resolution.

In some embodiments, as shown in FIG. 8B, the upscaling module upscale the residual between the downscaled feature image and the original input image once, and the residual of the 2×2 times resolution generated after the upscaling is superimposed onto an image generated by downscaling the first upscaled feature image of the 4×4 times resolution once. Then, a de-superimpose operation is performed on the superimposed image and the corrected first upscaled feature image of the 2×2 times resolution to determine the residual between the superimposed image and the corrected first upscaled feature image of the 2×2 times resolution. Then, the residual between the superimposed image and the corrected first upscaled feature image of the 2×2 times resolution is upscaled, and the upscaled residual is superimposed onto the first upscaled feature image of the 4×4 times resolution to obtain a corrected first upscaled feature image of the 4×4 times resolution.

As shown in FIG. 8B, based on the above principle, a corrected upscaled feature image of a 8×8 times resolution can also be realized by repeating the above steps.

FIG. 8C is a schematic diagram illustrating multiple corrections of an upscaled image using the residual between the upscaled image and the original image (that is, L=3, μ=2). FIG. 8C differs from FIG. 8B in that the first upscaled feature image needs to be downscaled multiple times and the residual between the downscaled image and the original input image is determined. In addition, the residual obtained after multiple downscaling is upscaled and superimposed onto the first upscaled feature image to perform multiple corrections on the first upscaled feature image. In some embodiments, the first upscaled feature image is corrected multiple times using the current residual only if the current residual is smaller than the previous residual. This process has been elaborated in the image processing system as shown in FIG. 6 and will not be described again here.

FIGS. 8A-8C show only three examples in which μ are equal to 0, 1, and 2. However, one of ordinary skill in the art can understand that μ can be set to any positive integer according to actual situation to realize multiple residual corrections of a super-resolution image. Similarly, although FIGS. 8A-8C only illustrates that L=3, one of ordinary skill in the at can understand that L can be set at any positive integer according to actual situation. Thus, an image processing system capable of generating super-resolution images of different resolution can be realized.

Figure 9A:
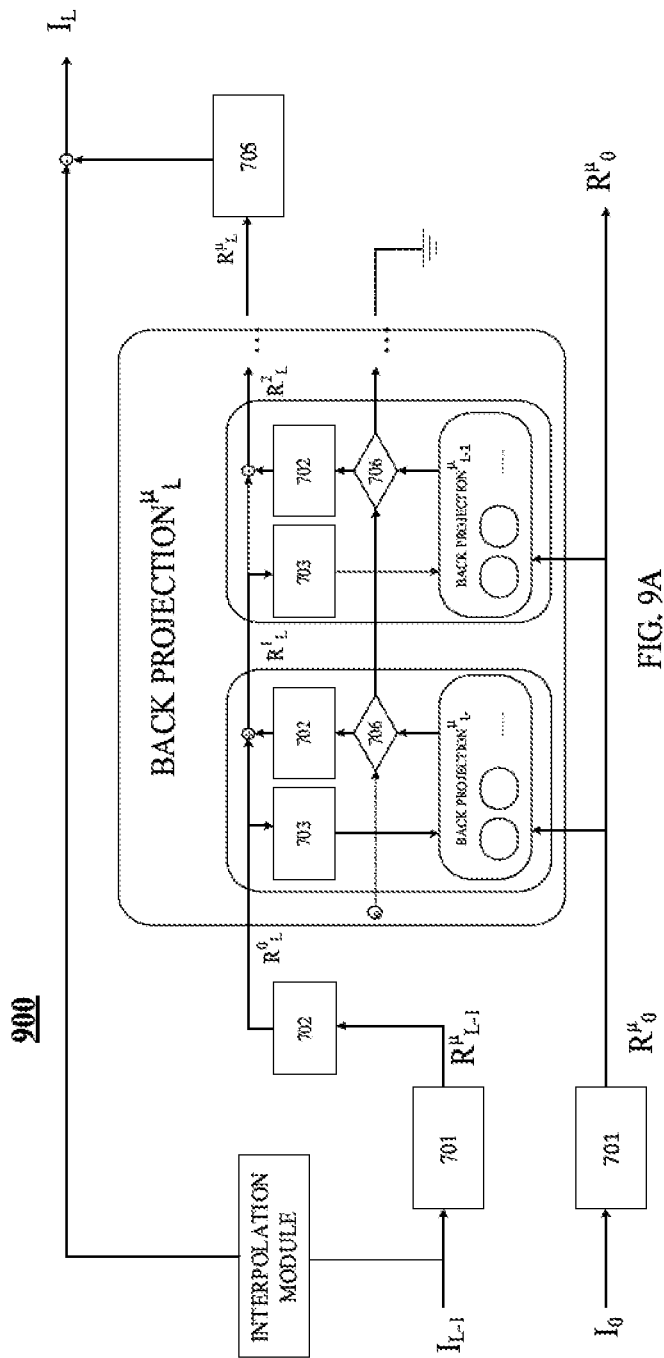
FIG. 9A is a schematic diagram of an image processing system according to one embodiment of the present disclosure.

FIG. 9A is a schematic diagram of an image processing system according to one embodiment of the present disclosure. As shown in FIG. 9A, the image processing system 900 includes an interpolating module. The interpolating module is configured to interpolate an input image $I_{L-1}$ to obtain an image of a higher resolution based on the input image $I_{L-1}$. The interpolation module may utilize traditional upscaling interpolation method such as bicubic interpolation method. In addition, a second super-resolution image based on the input image $I_{L-1}$ is generated by subjecting the input image $I_{L-1}$ through the convolutional network and the residual correction module. The two super-resolution images generated by the above two systems are superimposed to generate an output image.

The difference between the image processing system 900 as shown in FIG. 9A and the image processing system 700 as shown in FIG. 7A is that the image processing system 700 directly outputs a super-resolution image based on the input image while the image processing system 900 outputs a super-resolution image based on a detailed image of the input image. Therefore, although the modules in the image processing system 900 and the image processing system 700 have similar modular structures, the configuration of the convolutional networks constituting the systems is different. The image processing system 700 and the image processing system 900 can be distinguished by the training methods.

One of ordinary skill in the art will appreciate that in the image processing system 900 as shown in FIG. 9B, a residual determination module that uses a convolutional network to determine residual may also be employed.

Figure 10A:
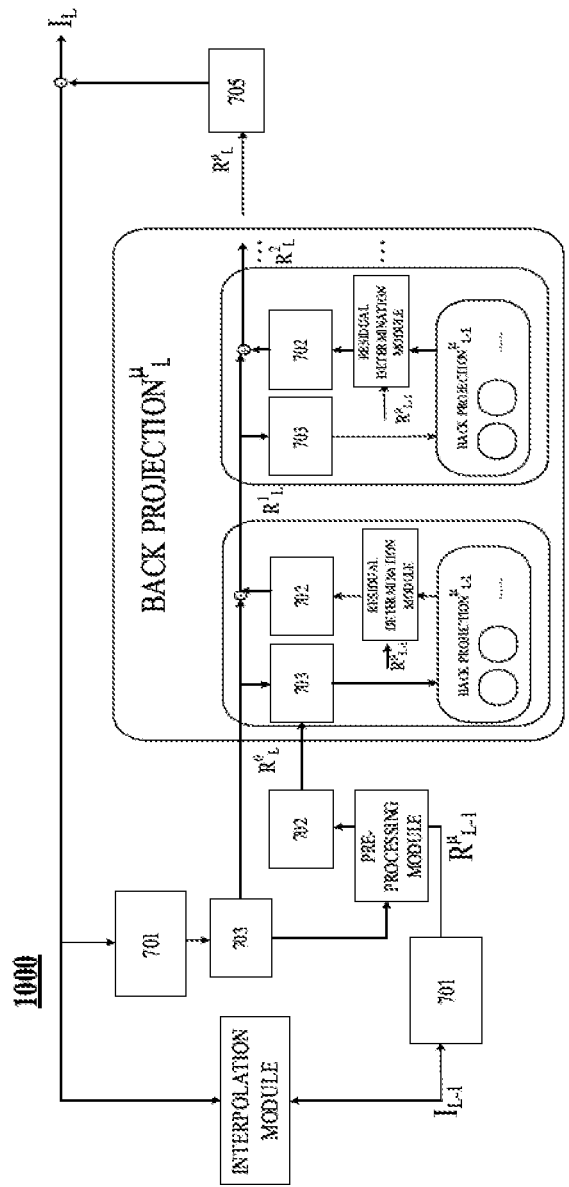
FIG. 10A is a schematic diagram of an image upscaling method according to one embodiment of the present disclosure.

FIG. 10A is a schematic diagram of an image processing system 1000 according to one embodiment of the present disclosure. In the residual correction system as shown in FIG. 9B, a splicing module and a transformation module are utilized to determine a current residual before each upscaling. However, in the image processing system 1000, since a residual does not need to be determined when an input image is being first upscaled, the input image can be directly inputted into the upscaling module. In order to assure the modules in the system are consistent and simplify the algorithm for implementing the above image processing system, a pre-processing module is utilized to pro-treat the input image before the first upscaling of the input image. As shown in FIG. 10A, the pre-processing module has a similar structure as the residual determination module as shown in FIG. 4B, that is, including a splicing module and a transformation module.

As shown in FIG. 10A, the feature image $R_{L-1}^{\mu}$ of the input image and the image feature obtained by first interpolating and then downscaling the input image are inputted to the pre-processing module. For example, as shown in FIG. 10A, a super-resolution image generated by a traditional interpolation algorithm can be obtained when the input image $I_{L-1}$ is interpolated. The analysis module 701 is utilized to generate a feature image of the super-resolution image and the downscaling module 703 is utilized to downscale the feature image to obtain a downscaled feature image where a resolution of the downscaled feature image is equal to the resolution of the feature image of the input image. The pre-processing module and the upscaling module are utilized to determine a first upscaled feature image based on the feature image of the input image. Here, although the pre-processing module and the residual determination module have similar structure, but during training, the feature images outputted by the pre-processing module and the residual determination module have different functions. Therefore, adjusting the parameters of the pre-processing module and the residual determination module respectively by the training process can enable the image processing system 1000 to implement the image processing function as described above.

Figure 10B:
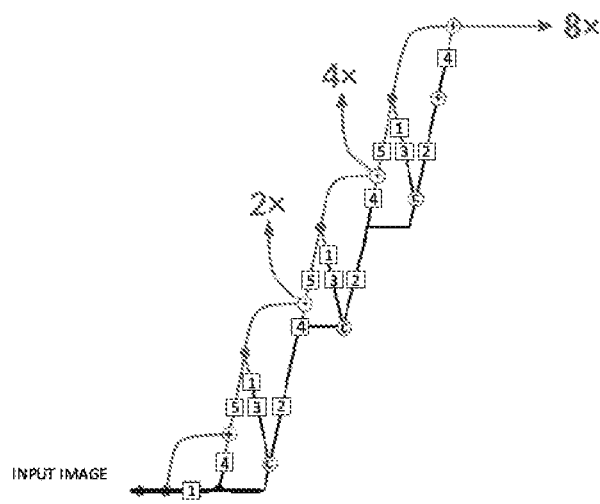
FIG. 10B is a schematic diagram of an image upscaling method according to one embodiment of the present disclosure.
Figure 10C:
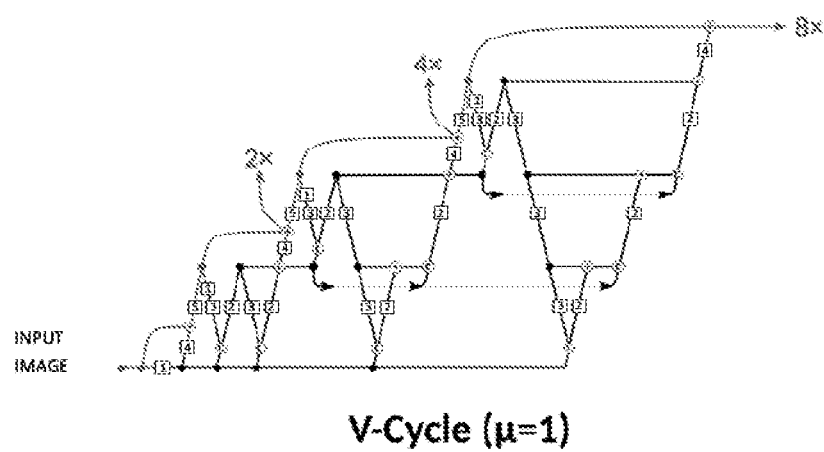
FIG. 10C is a schematic diagram of an image upscaling method according to one embodiment of the present disclosure.
Figure 10D:
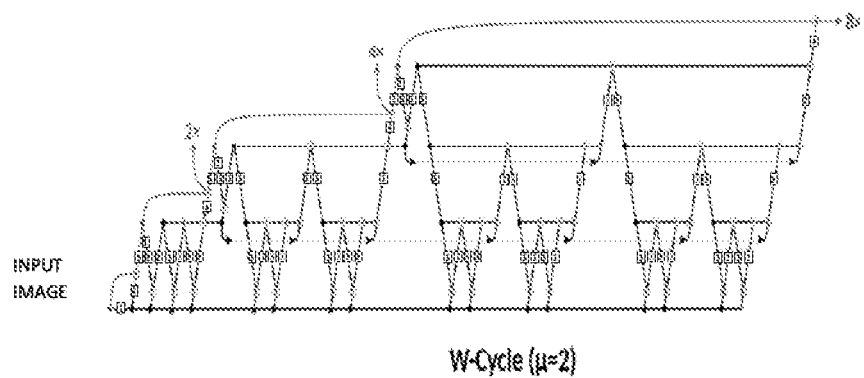
FIG. 10D is a schematic diagram of an image downscaling method according to one embodiment of the present disclosure.

FIGS. 10B-10D are schematic diagrams of an upscaling process for an image processing system 1000 according to one embodiment of the present disclosure.

FIG. 10B is a schematic diagram showing correction of an upscaled image without using a residual (that is, L=3 and μ=0). As shown in FIG. 10B, an image is inputted to the analysis module (1 represents the analysis module) and the analysis module outputs a feature image that represents the output image. The input image and the image obtained by subjecting the input image through the analysis module and the synthesis module (4) are superimposed to obtain a transformed input image (represented by a circle enclosing a plus sign). A classic interpolation model (5 represents the classic interpolation module) is utilized to obtain a super-resolution image of the transformed input image. An analysis module is utilized to obtain a feature image of the above super-resolution image, and after downscaling the feature image of the above super-resolution image (3 represents a downscaling module), a pre-processing module (represented by c) is utilized to pre-process the result obtained from the downscaling module and the result obtained from the analysis module. Then, a upscaling module (2 represents a upscaling module) is utilized to upscale the feature image outputted from the pre-processing module to form a super-resolution feature image representing the super-resolution image. In one embodiment, when the upscaling module is configured to double upscaling an image, the image processing process in FIG. 10B can generate an 8×8 upscaled super-resolution feature image.

FIG. 10C is a schematic diagram showing the correction of the upscaled image by using the residual between the upscale image and the original image.

FIG. 10C is a schematic diagram of a method of correcting the upscaled image one time using the residual between the upscaled image and the original image (that is, when L=3, μ=1). FIG. 10D is a schematic diagram of a method of correcting the upscaled image multiple times using the residual between the upscaled image and the original image (that is, when L=3, μ=2). FIGS. 10C and 10D respectively shows an image processing method including multiple residual corrections of an input image. These methods are similar to the processes shown in FIGS. 8B and 8C, and therefore, will not be described again here.

According to one embodiment of the present disclosure, a training method for the above image processing system is also provided. In the training method of the image processing system, a high-resolution image may be preset, and the image processing system is trained by using the high-resolution image and a low-resolution image generated by downscaling the original high-resolution image. When the image processing system is configured to perform multiple downscaling, low-resolution images of different resolutions based on the original high-resolution image can be generated. For example, when a resolution of the original high-resolution image is 512×512, low-resolution images of 256× 256 and 128×128 can be generated, and the low-resolution images can be used to train the image processing system. For example, the above low-resolution images can be inputted to the image processing system, and a loss function between the super-resolution image and the original high-resolution image is calculated. The loss function includes at least:

$$L_{res} = \sum_{l=0}^{L} w_l \sigma(R_l^{\mu})$$

where L represents the number of upscaling in the image processing system, w represents a predetermined weight factor, $\sigma(R_l^{\mu})$ represents a loss metric of the feature image $R_l^{\mu}$. Here, μ represents the number of residual corrections, and l represents the number of upscaling. The loss matric σ may be L1 norm, L2 norm, or Charbonnier loss functions, etc.

Figure 11:
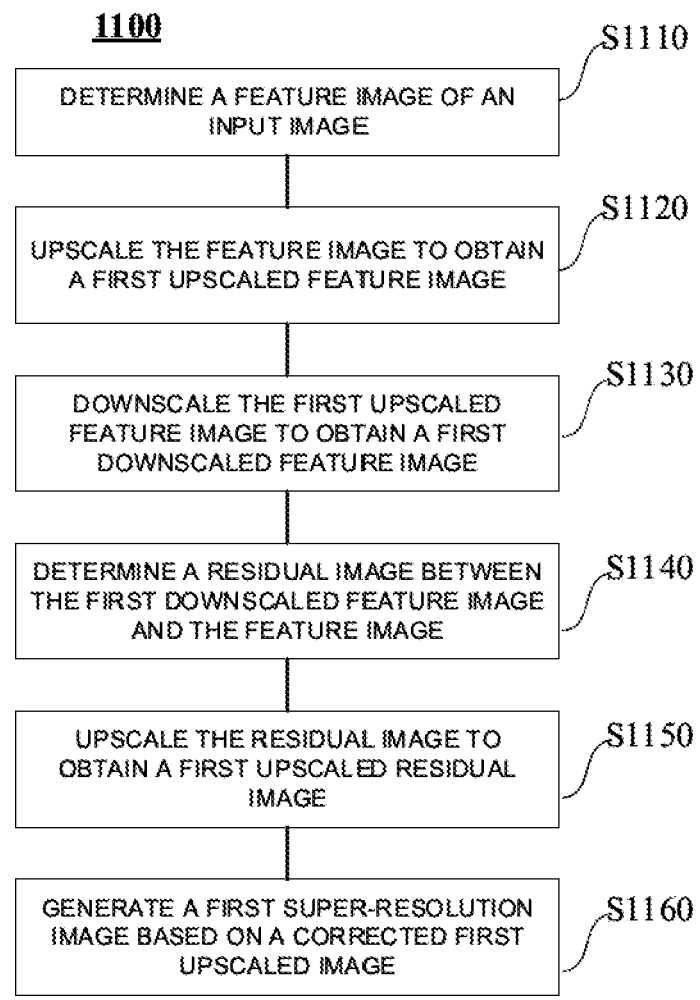
FIG. 11 is a flow chart of an image processing method according to one embodiment of the present disclosure.

FIG. 11 is an exemplary flowchart of an image processing method according to one embodiment of the present disclosure. The image processing method 1100 includes the following:

Step S1110 includes determining a feature image of an input image by an analysis convolutional network. A resolution of the feature image of the input image is equal to a resolution of the input image. A number of channels of the feature image of the input image is greater than the number of channels of the input image.

Step S1120 includes upscaling the feature image of the input image by using an upscaling convolutional network to obtain a first upscaled feature image. A resolution of the first upscaled feature image is larger than the resolution of the input image. A number of channels of the first upscaled feature image is equal to the number of channels of the feature image of the input image.

Step S1130 includes downscaling the first upscaled feature image by using a downscaling convolutional network to obtain a first downscaled feature image. A resolution of the first downscaled feature image is equal to the resolution of the input image, and a number of channels of the first downscaled feature image is also equal to the number of channels of the feature image of the input image.

In one embodiment, downscaling the first upscaled feature image using the downscaling convolutional network includes: downscaling the first upscaled feature image multiple times using a plurality of downscaling convolutional networks until the resolution of the first upscaled is downscaled to an image which has the same resolution as the input image.

Step S1140 includes determining a residual image between the first downscaled feature image and the feature image of the input image. In some embodiments, step S1140 may include de-superimposing the feature image of the input image and the first downscaled feature image to obtain a first residual. In some embodiments, step S1140 may include splicing the first downscaled feature image and the feature image of the input image according to a predetermined manner. The size of the spliced image is the sum of the sizes of the first downscaled feature image and the input image. A transformation convolutional network is utilized to transform the spliced image and output a first residual image between the first downscaled feature image and the feature image of the input image, wherein the size of the first residual image is equal to the size of the input image.

Step S1150 includes correcting the first upscaled feature image using the upscaled residual image. In some embodiments, correcting the first upscaled feature image using the upscaled residual image includes superimposing the first upscaled feature image and the upscaled residual image. In some embodiments, correcting the first upscaled feature image using the upscaled residual image includes superimposing the first upscaled feature image and the upscaled residual to obtain a third upscaled image; downscaling, by a downscaling convolutional network, the third upscaled image to obtain a second downscaled feature image; determining a second residual image between the second downscaled feature image and the feature image of the input image, wherein the second residual image indicates the difference between the second downscaled feature image and the feature image of the input image; and correcting the third upscaled image by using the second residual image between the second downscaled feature image and the feature image of the input image.

In some embodiments, correcting the third upscaled image by using the second residual image between the second downscaled feature image and the feature image includes: comparing the first residual image and the second residual image, wherein when the difference between the second downscaled feature image and the input image is smaller than the difference between the first downscaled feature image and the input image, the upscale convolutional network upscales the second residual image to obtain a second upscaled residual; and superimposing the first super-resolution image and the second upscaled residual to obtain a fourth upscaled image.

In some embodiments, comparing the first residual image and the second residual image includes: setting an average of absolute values of all elements or an arithmetic square root of the sum of squares of all elements in the pixel matrix of the first residual image as a first residual value; setting an average of absolute values of all elements or an arithmetic square root of the sum of squares of all elements in the pixel matrix of the second residual image as a second residual value; and comparing the first residual value and the second residual value.

Step S1160 includes generating a first super-resolution image based on the input image according to the corrected first upscaled feature image. In one embodiment, a synthesis convolutional network is utilized to synthesize the corrected first upscaled feature image into an image having an equal number of channels as the input image.

In some embodiments, the image processing method 1100 may further includes performing interpolation on the input image to obtain an enlarged image, wherein a resolution of the enlarged image is equal to the resolution of the super-resolution image; and superimposing the enlarged image and the super-resolution image to generate a super-resolution enlarged image based on the input image. In this embodiment, the super-resolution image generated by the convolutional network represents the details of the enlarged original input image. The details of the enlarged original input image can be used to supplemental the details of the enlarged super-resolution image generated by the classic residual method to obtain an enhanced super-resolution magnification result.

In the image processing method according to some embodiments of the present disclosure, a convolutional network can be utilized to generate a super-resolution output image based on the original low-resolution input image. Also, because the upscaled image is corrected by the residual between the upscaled image and the original image during each upscaling, therefore, the effect of the super-resolution images can be further enhanced.

It should be noted that, in the present disclosure, the modules (such as the upscaling module, the downscaling module, the analysis module, the synthesis module, and the transformation module . . . etc) can represent a convolutional network with the same structure. However, one of ordinary skill in the art can understand that the parameters of two convolutional networks of the same structure in an image processing system can be different. The term "comprising" or "including" or any other variant thereof is intended to encompass a non-exclusive inclusion, such that the process, method, article, or device that includes a series of elements includes not only those elements but also those that are not explicitly listed or other elements that are inherent to such processes, methods, articles, or equipment. In the absence of more limitations, the elements defined by the statement "including a . . . " do not exclude the existence of additional identical elements in the process, method, article or device that includes the elements.

In addition, the logic flows depicted in the present disclosure do not require the particular order shown, or sequential order, to achieve desirable results. The steps might be performed in parallel or separately performed and not in a sequential order.

It shall be noted that, any process, method description or block described above includes other implementations, wherein the functions may be executed other than the order illustrated or discussed, including a substantially simultaneous manner based on concerned function or an inverse order.

It shall be understood that each of the parts of the present invention may be implemented by hardware, software, firmware, or combination thereof. In the above embodiments, all or a part of steps ca be implemented through software or firmware stored in a memory and executable by an appropriate instruction execution system, for example, by instructing relevant hardware through a program that may be stored in a computer readable storage medium, such as ROM/RAM, magnetic disk, optical disk, etc.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. An image processing method, comprising:
    upscaling a feature image of an input image by an upscaling convolutional network to obtain a upscaled feature image;
    downscaling the upscaled feature image by a downscaling convolutional network to obtain a downscaled feature image;
    determining a residual image between the downscaled feature image and the feature image of the input image;
    upscaling the residual image between the downscaled feature image and the feature image of the input image to obtain an upscaled residual image;
    correcting the upscaled feature image using the upscaled residual image to obtain a corrected upscaled feature image; and
    generating a first super-resolution image based on the input image using the corrected upscaled feature image,
    wherein a resolution of the upscaled feature image is larger than a resolution of the feature image of the input image, and a resolution of the downscaled feature image is equal to the resolution of the feature image of the input image.

2. The image processing method according to claim 1, wherein determining the residual image between the downscaled feature image and the feature image of the input image comprises:
    splicing the downscaled feature image and the feature image of the input image to obtain a spliced image; and
    transforming the spliced image by a transformation convolutional network to form the residual image between the downscaled feature image and the feature image of the input image;
    wherein a size of the spliced image is a sum of sizes of the downscaled feature image and the feature image of the input image, and a size of the residual image is equal to a size of the feature image of the input image.

3. The image processing method according to claim 1, wherein determining the residual image between the downscaled feature image and the feature image of the input image comprises:
    de-superimposing the feature image of the input image and the downscaled feature image to obtain the residual image.

4. The image processing method according to claim 1, wherein correcting the upscaled feature image using the upscaled residual image to obtain a corrected upscaled feature image comprises:
    superimposing the upscaled feature image and the upscaled residual image.

5. The image processing method according to claim 1, wherein determining the residual image between the downscaled feature image and the feature image of the input image comprises:
    determining a first residual image between the downscaled feature image and the feature image of the input image;
    upscaling the first residual image between the downscaled feature image and the feature image of the input image to obtain an upscaled first residual image;
    correcting the upscaled feature image by using the upscaled first residual image to obtain a corrected first upscaled feature image;
    downscaling the corrected first upscaled feature image to obtain a second downscaled feature image; and
    determining a second residual image between the second downscaled feature image and the feature image of the input image.

6. The image processing method according to claim 5, wherein the steps of determining the first residual image to determining the second residual image are repeated until a $\mu$th residual image between a $\mu$th downscaled feature image and the feature image of the input image is determined, where $\mu$ is an integer larger than 2.

7. The image processing method according to claim 5, wherein upscaling the residual image between the downscaled feature image and the feature image of the input image to obtain the upscaled residual image comprises:
    comparing the first residual image and the second residual image, and
    upscaling the second residual image to obtain the upscaled residual image when a difference between the second downscaled feature image and the feature image of the input image is smaller than a difference between the first downscaled feature image and the feature image of the input image.

8. The image processing method according to claim 7, wherein comparing the first residual image and the second residual image comprises:
    determining an average of absolute values of all elements or an arithmetic square root of a sum of squares of all elements in a pixel matrix of the first residual image as a first residual value;
    determining correspondingly an average of absolute values of all element or an arithmetic square root of a sum of squares of all elements in a pixel matrix of the second residual image as a second residual value; and determining a difference of the first residual value and the second residual value.

9. The image processing method according to claim 7, wherein correcting the upscaled feature image using the upscaled residual image to obtain a corrected upscaled feature image comprises:
superimposing the upscaled feature image and the upscaled residual image to obtain the corrected upscaled feature image.

10. The image processing method according to claim 1, wherein upscaling the feature image of the input image by the upscaling convolutional network to obtain the upscaled image comprises:
upscaling the feature image of the input image n times using a plurality of upscaling convolutional networks to determine a plurality of upscaled images based on the input image,
wherein the plurality of upscaled images includes at least a first upscaled image and a nth upscaled image, a resolution of the nth upscaled image is larger than a resolution of the first upscaled image, and n is a positive integer greater than 1.

11. The image processing method according to claim 1, wherein downscaling the upscaled feature image by the downscaling convolutional network to obtain the downscaled feature image comprises:
downscaling the upscaled feature image n times using a plurality of downscaling convolutional networks to determine a plurality of downscaled feature images based on the first upscaled image,
wherein the plurality of downscaled images include at least a first downscaled feature image and a nth downscaled feature image, a resolution of the nth downscaled feature image is smaller than a resolution of the first downscaled image, and the resolution of the nth downscaled image is equal to the resolution of the feature image of the input image, and n is a positive integer greater than 1.

12. The image processing method according to claim 10, wherein the upscaled feature image is corrected $\mu$ times using upscaled residual images to obtain the corrected upscaled feature image, wherein $\mu$ is a positive integer greater than 2.

13. The image processing method according to claim 12, wherein n=2 and $\mu$=1; or n=3 and $\mu$=1; or n=2 and $\mu$=2; or n=3 and $\mu$=2.

14. The image processing method according to claim 1, further comprising:
interpolating the input image to obtain a second super-resolution image based on the input image; and
superimposing the first super-resolution image and the second super-resolution image,
wherein a resolution of the second super-resolution image is equal to a resolution of the first super-resolution image.

15. An image processing system, comprising:
a first upscaling module, configured to upscale a feature image of an input image to obtain a upscaled feature image;
a first downscaling module, configured to downscale the upscaled feature image to obtain a downscaled feature image;
a first residual determination module, configured to determine a residual image between the downscaled feature image and the feature image of the input image;
a second upscaling module, configured to upscale the residual image between the downscaled feature image and the feature image of the input image to obtain a upscaled residual image; and
a correction module and a synthesis module after the second upscaling module;
wherein a resolution of the upscaled feature image is larger than a resolution of the feature image of the input image, and a resolution of the downscaled feature image is equal to a resolution of the feature image of the input image; and
the correction module is configured to correct the upscaled feature image using the upscaled residual image to obtain a corrected first upscaled feature image; and the synthesis module is configured to generate a first super-resolution image based on the input image using the corrected first upscaled feature image.

16. The image processing system of claim 15, further comprising:
an interpolating module before an analysis module;
wherein the interpolating module is configured to interpolate the input image to obtain a second super-resolution image based on the input image, wherein a resolution of the second super-resolution image is equal to a resolution of the first super-resolution image.

17. The image processing system of claim 16, further comprising:
a pre-processing module before the first upscaling module;
wherein the pre-processing module has a same structure as the first residual determination module, and the pre-processing module is configured to pre-treat the input image before the first upscaling module.

18. The image processing system of claim 15, after the correction module, further comprising:
a second downscaling module;
a second residual determination module; and
a third upscaling module,
wherein the second downscaling module is configured to downscale the corrected first upscaled feature image to obtain a second downscaled feature image; the second residual determination module is configured to determine a second residual image between the second downscaled feature image and the feature image of the input image; and the third upscaling module is configured to upscale the second residual image to obtain a corrected second residual image.

19. The image processing system of claim 15, wherein the first upscaling module comprises a plurality of sub-upscaling modules;
wherein the plurality of sub-upscaling modules is configured to upscale the feature image of the input image n times using a plurality of upscaling convolutional networks to determine a plurality of upscaled images based on the input image,
wherein the plurality of upscale images includes at least a first upscaled image and a nth upscaled image, a resolution of the nth upscaled image is larger than a resolution of the first upscaled image, and n is a positive integer greater than 1.

20. The image processing system of claim 15, wherein the first downscaling module comprises a plurality of sub-downscaling modules;
wherein the plurality of sub-downscaling modules is configured to downscale the upscaled feature image n times using a plurality of downscaling convolutional networks to determine a plurality of downscaled feature images based on the upscaled image, wherein the plurality of downscaled images include at least a first downscaled feature image and a nth downscaled feature image, a resolution of the nth downscaled feature image is smaller than a resolution of the first downscaled image, and the resolution of the nth downscaled image is equal to a resolution of the input image.

21. An image processing apparatus, comprising a non-transitory memory and a processor, wherein the non-transitory memory stores a program code readable by the processor, and when the processor executes the program code, the image processing apparatus is caused to perform the following steps:

upscaling a feature image of an input image by an upscaling convolutional network to obtain a upscaled feature image;

downscaling the upscaled feature image by a downscaling convolutional network to obtain a downscaled feature image;

determining a residual image between the downscaled feature image and the feature image of the input image;

upscaling the residual image between the downscaled feature image and the feature image of the input image to obtain an upscaled residual image;

correcting the upscaled feature image using the upscaled residual image to obtain a corrected upscaled feature image; and generating a first super-resolution image based on the input image using the corrected upscaled feature image, wherein a resolution of the upscaled feature image is larger than a resolution of the feature image of the input image, and a resolution of the downscaled feature image is equal to the resolution of the feature image of the input image.

22. A training method, the method comprising:

performing image processing on an input image using the image processing system according to claim 15 in a finite number of iterations, wherein an objective function is optimized during the finite number of iterations, the objective function is a loss function between the first super-resolution image and the input image, and the objective function comprises:

a loss residual:

$$L_{res} = \sum_{l=0}^{L} w_l \sigma(R_l^\mu)$$

wherein L is a number of times of upscaling in the image processing system, w is a predetermined weigh factor, and σ is a loss metric.

* * * * *